May 8, 1956   F. G. KING   2,744,554
SLICING MACHINE CONTROL
Filed March 22, 1951   5 Sheets-Sheet 1

INVENTOR:
FREDERICK GEORGE KING
BY
Spencer, Johnston, Cook & Root
ATT'YS

INVENTOR:
FREDERICK GEORGE KING
BY
Spencer, Johnston, Cook & Root
ATT'YS

May 8, 1956      F. G. KING      2,744,554
SLICING MACHINE CONTROL
Filed March 22, 1951      5 Sheets-Sheet 3
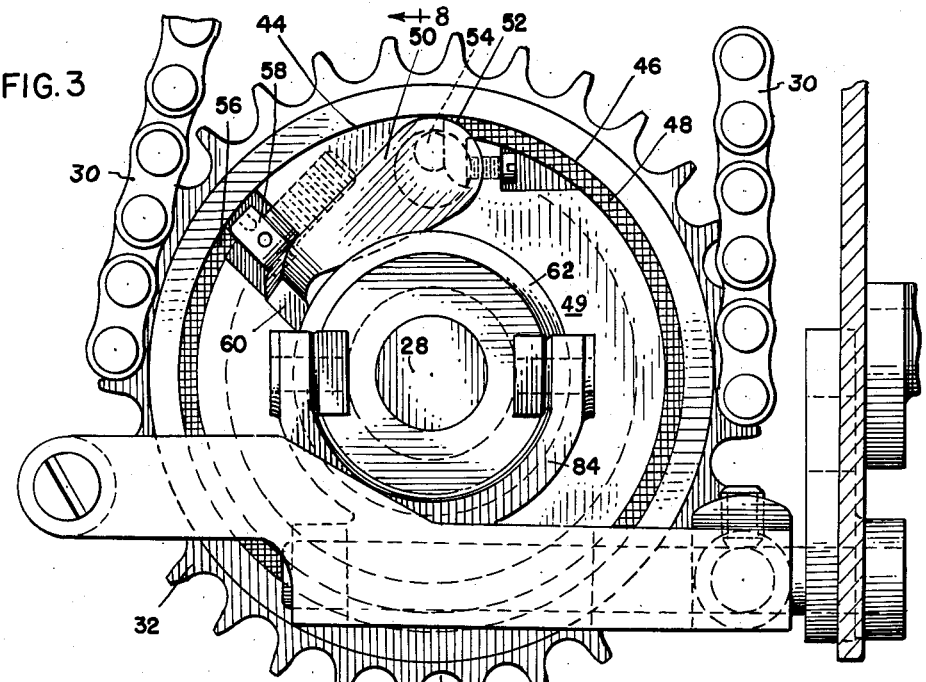
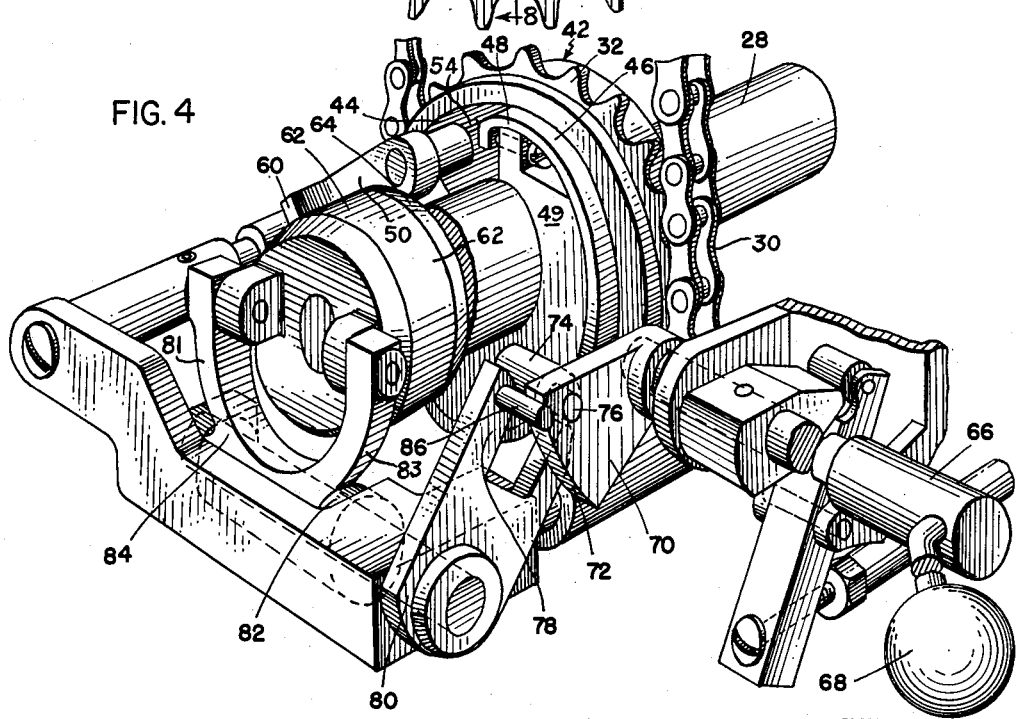
INVENTOR:
FREDERICK GEORGE KING
BY
Spencer, Johnston, Cook & Root
ATT'YS

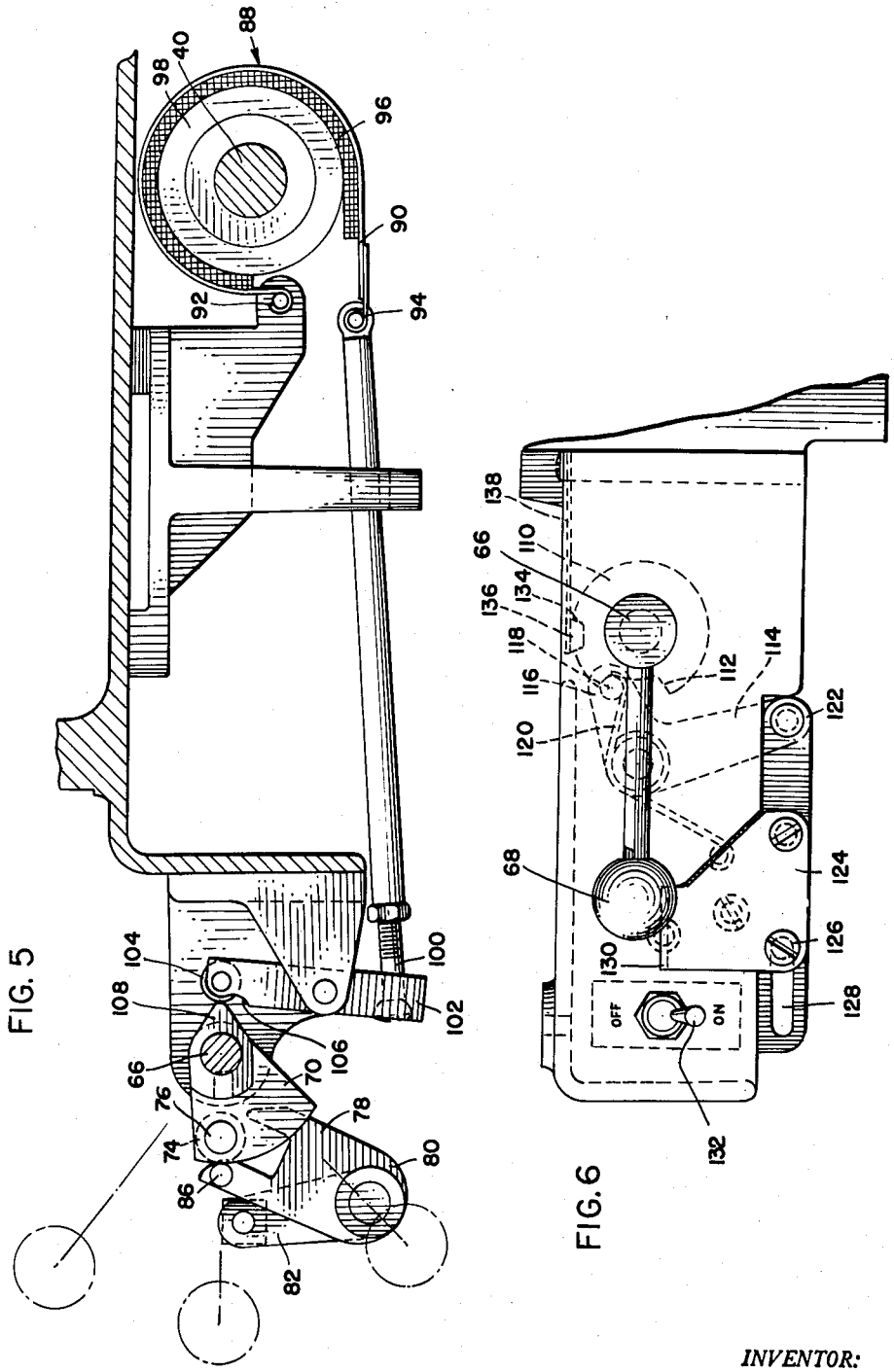

May 8, 1956  F. G. KING  2,744,554
SLICING MACHINE CONTROL
Filed March 22, 1951  5 Sheets-Sheet 5

INVENTOR:
FREDERICK GEORGE KING
BY
Spencer, Johnston, Cook & Root
ATT'YS

United States Patent Office 2,744,554
Patented May 8, 1956

2,744,554
SLICING MACHINE CONTROL

Frederick George King, London, England, assignor to U. S. Slicing Machine Company, Inc., La Porte, Ind., a corporation of Indiana Application March 22, 1951, Serial No. 216,955

Claims priority, application Great Britain September 28, 1950

2 Claims. (Cl. 146—102)

This invention relates to slicing machines of the type comprising a rotatable slicing knife, a reciprocable carriage and a power unit for driving the knife and carriage. More particularly, the invention relates to a control means for adjusting the operation of the slicing machine.

It is an object of the invention to provide an improved slicing machine which is adjustable to operate in a number of different ways.

Another object of the invention is to provide a control mechanism for slicing machines by which the operation of the knife and carriage may be adjusted to a number of various combinations.

Another object of the invention is to provide an improved slicing machine having provision for selective operation of the machine entirely by the power unit, operation of the knife by the power unit while the carriage is held stationary and operation of the knife by the power unit while the carriage is independently reciprocable by hand.

A further object of the invention is to provide clutch and brake means on a slicing machine and means for selectively adjusting the clutch and brake for cooperative or independent operation.

Still another object of the invention is to provide means for preventing operation of the power unit when the clutch is engaged.

These and other objects and advantages of the invention will become more apparent from a consideration of the following description taken in conjunction with the drawings in which:

Figure 3 is an elevational view taken along the lines 3—3 of Figure 2 showing only those parts associated with the clutch and the sprocket;

Figure 4 is a perspective view looking in the direction of the lines 4—4 of Figure 2;

Figure 5 is a transverse sectional view taken along the lines 5—5 of Figure 1;

Figure 6 is a front elevational view taken from the lines 6—6 of Figure 1;

Figure 7 is an enlarged fragmentary elevational view of the right-hand end of the device shown in Figure 1.

The invention contemplates a control mechanism for slicing machines by which the knife and carriage may be operated cooperatively or independently through various adjustments to the clutch and braking elements of the machine. The invention also provides a means for preventing operation of the switch for the power unit when the clutch is in engaged position to drive the knife. One embodiment of the invention will be described herein in detail in order to illustrate the invention.

The invention comprises a slicing machine having in combination, a brake applicable to the reciprocable carriage, a clutch between the power unit and knife on the one hand and the carriage on the other hand and control mechanism by selected manipulation of which the machine can be adjusted for operation under any one of the following conditions:

(1) With the clutch in and brake off.
(2) With the clutch out and the brake on.
(3) With the clutch out and the brake off.

Under condition (1) with the power unit on, the knife and carriage will both be driven by the power unit. Under condition (2) with the power unit on, the knife will be driven by the power unit and the carriage will be held stationary by the brake. This condition is suitable for sharpening the knife. Under condition (3) with the power unit on, the knife will be driven by the power unit and the carriage will be free for individual reciprocation by hand. This condition is particularly suitable when it is desired to advance the carriage slowly past the knife edge to prevent breakage of easily breakable substances.

Figure 1:
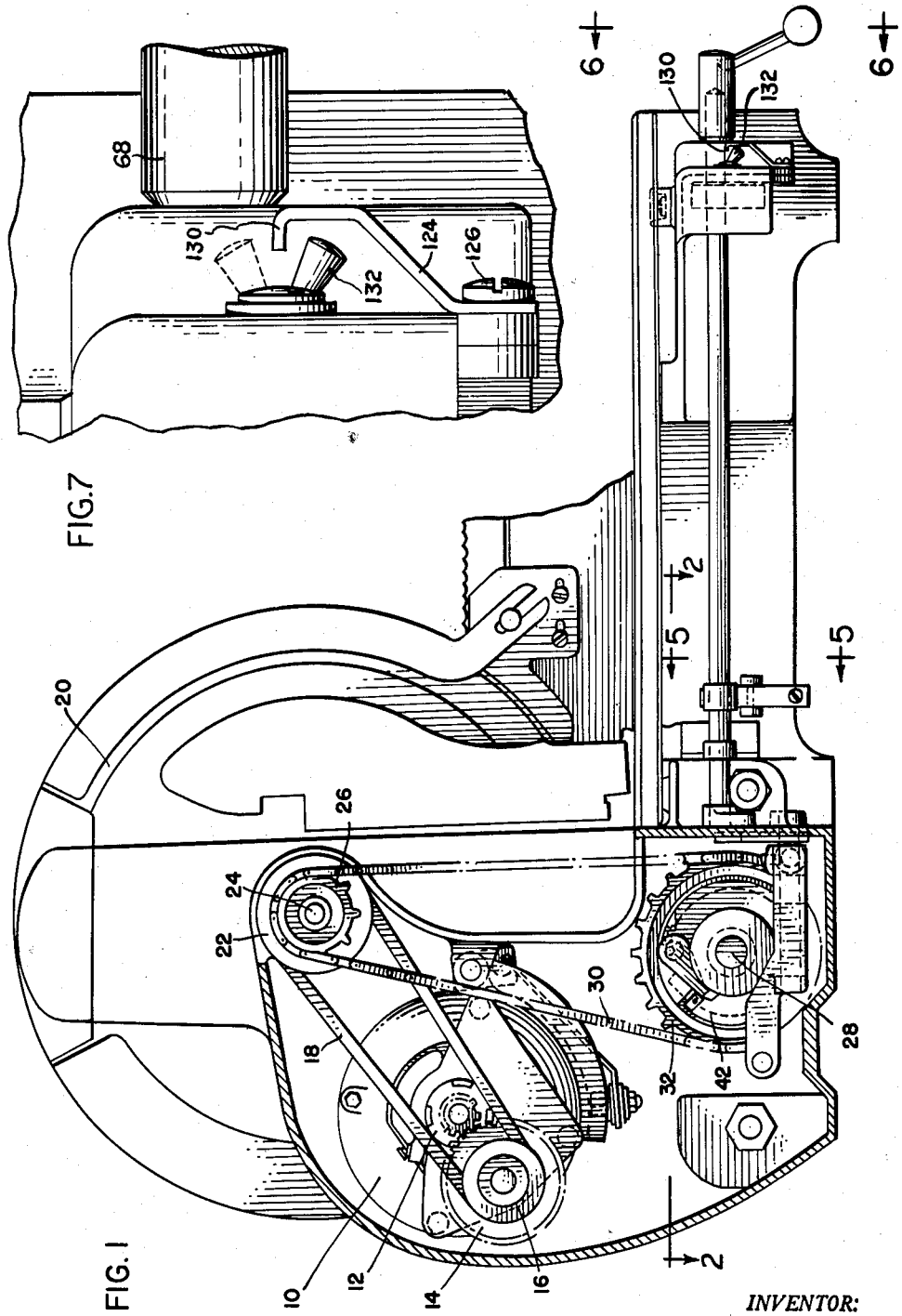
Figure 1 is a side elevational view of a slicing machine with parts of the cover cut away to expose the operating mechanism.

In Figure 1 of the drawings a slicing machine is illustrated having an electric motor 10 which is coupled by means of the gears 12 and 14 to the pulley 16. The belt 18 connects the motor 10 to the knife 20 through the pulleys 16 and 22 and the knife shaft 24. A sprocket 26 is located on the knife shaft 24 and connects the knife shaft through the chain 30 to the sprocket 32. The cross shaft 28 is connected through intermeshing bevel gears 34, 36 and 38 (Figure 2) to a horizontal shaft 40, which in turn operates a conventional crank and connecting rod (not shown) to drive the reciprocable carriage. The above mechanism is usual in machines of the type disclosed herein.

A clutch 42 is interposed on the cross shaft 28 and is employed to transmit the motion of the sprocket 32 to the cross shaft 28. The details of the clutching arrangement are illustrated in Figures 2, 3, 4 and 8 in which the clutch 42 may be seen to be of the internal expanding class. The sprocket 32 has a smooth inner drum surface 44 which is adapted to be engaged by the exterior surface 46 of a band of suitable material 48. The band 48 is mounted on the peripheral surface of an inner clutch member 49 and rigidly keyed to shaft 28 for rotation therewith. In engaged position the band 48 is internally expanded to contact the surface 44 of the rotating sprocket 32. In this position the motion of the sprocket 32 will be transmitted to the cross shaft 28. In disengaged position the band 48 and its associated cross shaft 28 will not rotate in response to the rotation of the sprocket 32.

A clutch engaging member 50 is adapted to engage the end 52 of the band 48 through the eccentrically mounted pin 54. Movement of the pin 54 against or away from the band 48 causes the band to expand or contract since one end of the band 56 is rigidly connected to the inner clutch member 49 by means of a screw 58. The clutch engaging member 50 has integral therewith an intermediate portion 59 journalled for rotation in an opening in the inner clutch member 49 forming a bearing surface 61. Member 50 is held against axial movement by the cooperating pin 63 and annular groove 65 in the bearing surface and is caused to rock and change position by the contact of an arm 60 in response to the longitudinal movement of the member 62 which is slidably mounted on a hub portion 67 of inner clutch member 49. The tapered surface 64 of the member 62 is in contact with the arm 60 in such fashion that longitudinal movement of the member 62 will have the effect of raising or lowering the arm 60 and rotating the pin 54 to expand or contract the band 48. In a clutch of this class there is no lateral displacement of the sprocket wheel which remains coplanar with the driving sprocket wheel 26.

The clutch 42 is operable in response to the adjustment of a longitudinal control shaft 66 which is adapted to be adjusted by movement of the three-positional handle 68 located at one end thereof. At the opposite end of the shaft 66 is located a plate 70 which is roughly triangular in shape and has an arcuate edge 72 thereon. The plate 70 is positioned for rotational movement about the axis of the shaft 66. A roller 74 is mounted on the plate 70 by means of the pivot pin 76. The roller 74 is adapted to engage the forked end 78 of one arm 80 of a bell crank lever 82. The opposite end 84 of the bell crank lever 82 is formed as a yoke with arms 81 and 83 disposed on opposite sides of slidable member 62 and pivotally connected thereto for sliding said member 62 thereby engaging or disengaging the clutch 42.

The arangement is such that when the handle 68 is in its lower position, the clutch 42 will be engaged by the action of the roller 74 on the forked arm 78 of the bell crank lever 82. When the handle is raised to its intermediate position, the roller 74 forces the lever 82 to turn and withdraw the member 62 thereby relaxing the clutch 42 to disengaged position. In this position the arcuate edge 72 of the plate 70 engages a pin 86 on the forked member 78 and assists in maintaining the relative position of the members. When the handle 68 is moved into its raised position, the arcuate edge 72 remains in contact with the pin 86 and holds the slidable member 62 outwardly whereby the clutch 42 will remain in disengaged position. Thus it will be seen that the clutch 42 is maintained in engaged position only when the handle 68 is in its lowered position.

Figure 2:
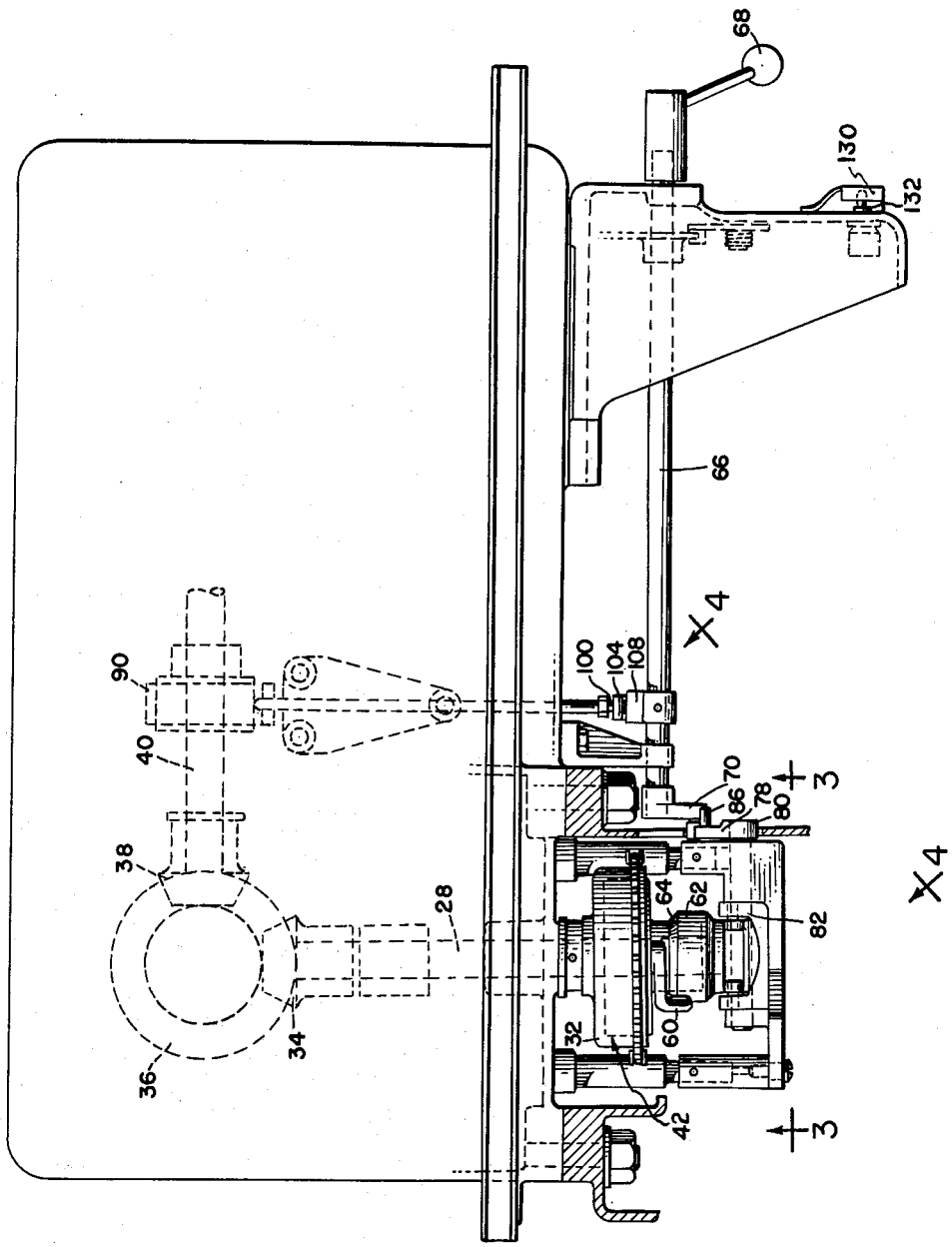
Figure 2 is a partial sectional view from the top of the machine looking in the direction of 2—2 of Fig. 1, exposing the clutch mechanism.
Figure 8:
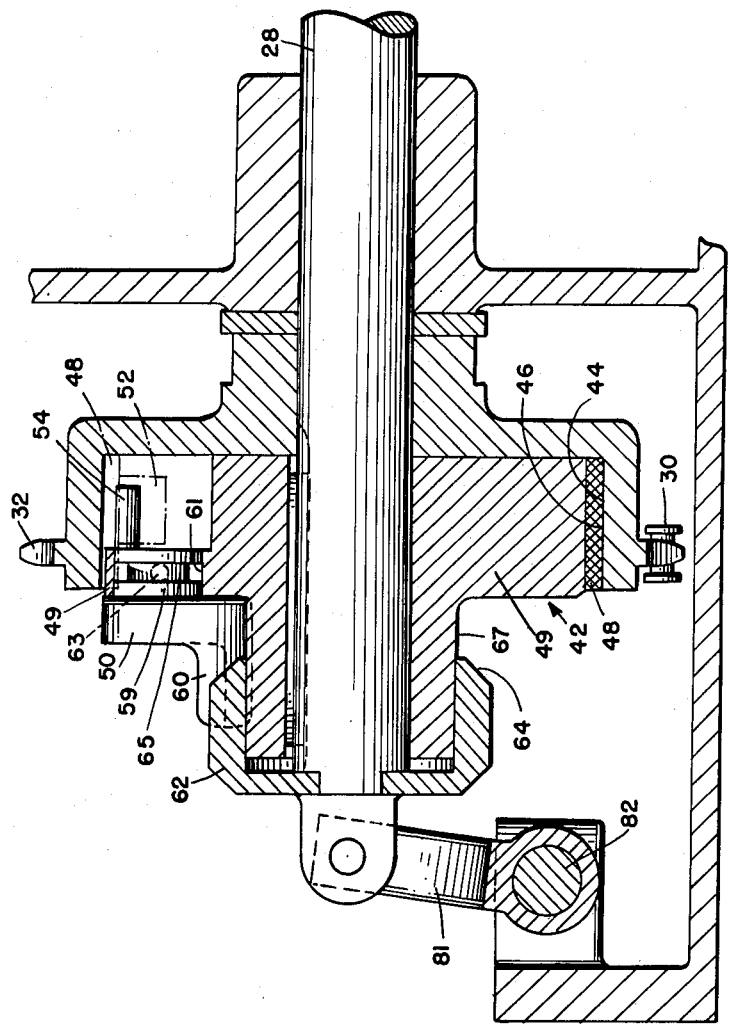
Figure 8 is a vertical sectional view taken along the plane of line 8—8 of Figure 3.

The braking mechanism is illustrated in Figures 2 and 5. As shown therein the brake 88 is applied to the fly wheel shaft 40, and comprises a metal strap 90 which is rigidly secured at one end 92 to a part of the frame and movably secured at the other end 94. A layer of band material 96 is secured to the strap 90 and is adapted to embrace a pulley 98 on the shaft 40. The end 94 of the strap 90 is attached to the slidable member 100 which in turn engages one end of a pivotally mounted lever 102. The other arm of the lever 102 has a cam roller 104 mounted thereon and a cooperating recess 106 located inside the periphery of the roller 104. A single hump cam 108 is rigidly positioned on the shaft 66 and the hump of the cam 108 is adapted to contact the roller 104 when the handle 68 is in intermediate position. When the cam 108 contacts the roller 104 the strap 90 is pulled taut and the rotational motion of the shaft 40 is arrested. When the control handle 68 is in lowered position, the cam 108 does not engage the roller 104 and the brake is not applied. Similarly when the handle 68 is in raised position, the cam 108 will rest in the recess 106 and relax the brake. The arrangement of the cam 108 and the plate 70 about the shaft 66 provides for simultaneous operation of the brake and clutch.

A switch controlling device is illustrated in Figures 1, 2 and 6. The mechanism comprises a disc 110 secured to the control shaft 66 and formed with a peripheral "lost motion" recess 112. The device also includes a bell crank lever 114, one arm of which 116 has a pin 118 adapted to enter the recess 112. The lever 114 is acted upon by a torsion spring 120 which urges the lever toward one limit of its movement. The other arm 122 of the lever 114 is attached to an obstructive component 124 which is slidably mounted through the pin 126 and slot 128. The component 124 has an angularly extending flange 130 at the upper end thereof movable into and out of the path of movement of a switch arm 132 (Figures 6 and 7).

The arrangement is such that when control handle 68 is in the intermediate position with the clutch disengaged and the brake on, the torsion spring 120 urges the lever 114 to a position to hold the obstructive component 124 clear of the switch 132 so that the switch can be freely operated as in Figure 6. The obstructive component 124 is similarly positioned when the handle 68 is in its raised position with the clutch disengaged and the brake off. The lever 114 remains in the same position by virtue of the "lost motion" effect of the recess 112. When the handle is lowered from the intermediate position of Figure 6, one end of the recess 112 engages the pin 118 and forces the bell crank lever 114 into its opposite position so that the obstructive component 124 slides toward the left into a position in which the flange 130 is immediately above the switch arm 132 when in its lowered position, as in Figure 7, or immediately below the switch arm 132 when in its upper position as shown in dotted lines in Figure 7, whereby it prevents operation of the switch 132. Hence, if the machine is running it cannot be stopped, or if it is stopped it cannot be started when the handle is in its lowered position, i. e., when the clutch is in and the brake off.

In order that the control handle 68 be normally urged to the intermediate position, which is the normal position when the machine is not in use, a notch or detent 134 is cut in the disc 110 (Figure 6). A tooth or latch 136 is yieldably mounted on the spring 138 so that it will be urged into the notch 134. A positive force must be applied to the handle 68 in order to displace the tooth 136 from the notch 134 and allow movement of the handle into raised or lowered position.

The clutch and brake combination is so designed to cooperate that with the motor running the brake will be applied almost instantly when the control shaft handle is adjusted to position (2) to bring the clutch out and put the brake on. In this fashion the "coasting" of the reciprocating carriage is eliminated with the result that the operator can readily bring it to rest in any selected position.

From the foregoing it will be apparent that I have provided a slicing machine which may be adjusted to operate in a number of different ways. A variety of combinations of knife and carriage movement are provided in which the knife and carriage may be operated independently or cooperatively in response to the simple manual adjustment of a control handle. The invention makes possible the adjustment of a slicing machine in a manner which is useful and which has heretofore been unknown in the art.

The invention is hereby claimed as follows:

1. In a slicing machine having a continuously rotating knife shaft, a slicing knife secured on the knife shaft, and a reciprocating carriage driven by a carriage shaft which is drivingly coupled to a clutch shaft, control apparatus for selectively driving and braking the movement of the carriage, said apparatus comprising a sprocket rotatably mounted on the clutch shaft, and a chain drive coupling the clutch shaft to the knife shaft to be continuously rotated thereby, said sprocket having a drum part with an inner cylindrical surface, a clutch mounted on the clutch shaft and rotatable therewith, said clutch being within the drum part of the sprocket and having an expandable band for engagement with the inner cylindrical surface thereof, a clutch operating member mounted on the clutch and adapted to expand the band outwardly, a shiftable member having a part disposed around the clutch shaft and in contact with the clutch operating member, a brake drum mounted on the carriage shaft, a brake band engaging the brake drum for braking the movement of the carriage, and a hand operated member adapted to be selectively moved into any of several operating positions, said hand operated member being mechanically coupled to the shiftable member and being operable to move the shiftable member axially of the clutch shaft thereby causing the clutch operating member to expand the band and engage the clutch when the hand operated member is moved into a first of the operating positions, said hand operated member being further mechanically coupled to the brake band and being operable to tighten the brake band upon the brake drum thereby braking the movement of the carriage when the hand operated member is moved into a second of the operating positions.

2. In a slicing machine having an electric motor coupled with a continuously rotating knife shaft, a slicing knife secured on the knife shaft, and a reciprocating carriage driven by a carriage shaft which is drivingly coupled at a right angle to a clutch shaft, control apparatus for selectively driving and braking the movement of the carriage, said apparatus comprising a sprocket rotatably mounted on the clutch shaft, and a chain drive coupling the clutch shaft to the knife shaft to be continuously rotated thereby, said sprocket having a drum part with an inner cylindrical surface, a clutch mounted on the clutch shaft and rotatable therewith, said clutch being within the drum part of the sprocket and having an expandable band for engagement with the inner cylindrical surface thereof, a clutch engaging member mounted on the clutch and adapted to expand the band outwardly, a shiftable member having a part disposed around the clutch shaft and in contact with the clutch engaging member, a brake drum mounted on the carriage shaft, a brake band encircling the brake drum for braking the movement of the carriage, and a hand operated member adapted to be selectively moved into any of three operating positions, said hand operated member being mechanically coupled to the shiftable member and being operable to move the shiftable member axially of the clutch shaft thereby causing the clutch engaging member to expand the band and engage the clutch when the hand operated member is moved into a first of the operating position, said hand operated member being further mechanically coupled to the brake band and being operable to tighten the brake band upon the brake drum thereby braking the movement of the carriage when the hand operated member is moved into a second of the operating positions.

References Cited in the file of this patent
UNITED STATES PATENTS

| | | |
|---|---|---|
| 1,525,965 | Thomas | Feb. 10, 1925 |
| 1,865,584 | Perry | July 5, 1932 |
| 2,081,256 | Van Berkel | May 25, 1937 |
| 2,108,306 | Cooper | Feb. 15, 1938 |
| 2,412,079 | Brustowsky | Dec. 3, 1946 |